United States Patent
Nicolas et al.

(10) Patent No.: US 7,641,752 B2
(45) Date of Patent: Jan. 5, 2010

(54) PROCESS FOR LAYING A STRIP CONTINUOUSLY ON A TOROIDAL SURFACE

(75) Inventors: Serge Nicolas, Clermont-Ferrand (FR); Nicolas Chevaux, Issoire (FR); Patrice Monnereau, Culhat (FR)

(73) Assignee: Michelin-Recherche et Technique S.A., Granges-Paccot (CH)

( * ) Notice: Subject to any disclaimer, the term of this patent is extended or adjusted under 35 U.S.C. 154(b) by 565 days.

(21) Appl. No.: 10/993,360

(22) Filed: Nov. 22, 2004

(65) Prior Publication Data

US 2007/0199661 A1 Aug. 30, 2007

(30) Foreign Application Priority Data

Nov. 21, 2003 (FR) .................................. 03 13763

(51) Int. Cl.
*B29D 30/60* (2006.01)
*B29C 70/38* (2006.01)

(52) U.S. Cl. ....................... 156/130; 156/117; 156/189; 156/360; 156/361

(58) Field of Classification Search ................. 156/117, 156/130, 173, 175, 189, 397, 360–361
See application file for complete search history.

(56) References Cited

U.S. PATENT DOCUMENTS 3,223,572 A * 12/1965 Holloway et al. ........... 156/397

| 3,251,722 | A |  | 5/1966 | Holman |
| 3,574,040 | A |  | 4/1971 | Chitwood et al. |
| 4,240,863 | A |  | 12/1980 | Vinton |
| 4,750,965 | A | * | 6/1988 | Pippel et al. ................. 156/361 |
| 4,775,733 | A |  | 10/1988 | Kanemura et al. |
| 4,997,510 | A | * | 3/1991 | Shinno et al. ................. 156/361 |
| 5,335,415 | A |  | 8/1994 | Okufuji |
| 5,395,475 | A |  | 3/1995 | Ozawa et al. |

FOREIGN PATENT DOCUMENTS

FR 2579130 A1 * 9/1986

* cited by examiner

*Primary Examiner*—Geoffrey L Knable
(74) *Attorney, Agent, or Firm*—Buchanan Ingersoll & Rooney PC (57) ABSTRACT

A mechanism for laying a strip on a receiving surface rotating about a first axis. The mechanism includes a laying head moving along a second axis oriented parallel to the axis of rotation of the surface and along a third axis oriented parallel to a radial direction passing through the point of contact between the receiving surface and a strip applicator of the laying head. The laying head is rotatable about a front axis oriented substantially perpendicular to the second and third axes and passing through the contact point. the laying includes a device for estimating the value of the of the angle α formed by a tangent to the transverse profile of the surface and the second axis. The movements of the laying head are determined by the value of the angle α in such a way as to displace the laying head in a direction parallel to the tangent following the transverse profile of the receiving surface.

12 Claims, 9 Drawing Sheets

PROCESS FOR LAYING A STRIP CONTINUOUSLY ON A TOROIDAL SURFACE

The present application claims priority under 35 U.S.C. §119 to patent application Ser. No. 03/13763 filed in France on Nov. 21, 2003.

BACKGROUND

The present invention relates to a process for laying a strip continuously on a profile which is generally toroidal in shape.

These days, continuous strip laying is widespread in the tyre industry and various processes have been described for depositing rubber strips or cord plies in the radial or circumferential direction.

More particularly, the field of the invention relates to laying a strip continuously in the circumferential direction on the toroidal surface of a tyre casing, where the width of the strip is very much less than the width of the receiving surface and where, moreover, the thickness of the strip is very much less than its width.

The processes suitable for performing these functions have been known for a long time and are described, by way of example, in patent nos. U.S. Pat. Nos. 3,251,722, 4,240,863 and 4,775,733 or, in a more recent version of the prior art, in U.S. Pat. No. 5,335,415.

These apparatuses are generally composed of:
a frame allowing support and rotation of the surface to be covered,
a module supplying a strip of calibrated size; this strip may equally well come from a reel on which it has been wound beforehand or, more generally, directly from a calender or an extruder incorporated in the installation,
a head for applying the strip to the receiving surface, cooperating with the above-described module and having the function of depositing the strip tangentially on said rotating receiving surface,
an automatic control device for the relative displacements of the application head relative to the receiving surface to be covered.

The arrangement of these various modules varies from one solution to another, depending on whether the application head is moved around the laying surface or whether the laying surface is displaced relative to a stationary application head. The automatic control device in turn varies from entirely mechanical solutions to solutions making extensive use of electronics and computing to control positioning motors controlling the respective movements of the application head or of the frame supporting the tyre or alternatively rotational drive of the tyre.

However, all these solutions are characterised in that the automatic control devices make extensive use of templates, in the case of mechanical or electromechanical solutions, or of calculation algorithms founded on precise, preestablished knowledge of the shape and position of the transverse profile of the receiving surface. For each full rotation of the laying surface, the transverse pitch of the movement of the application head relative to the receiving surface is predetermined as a function of the width of the strip and the position of the application head relative to a given sector of the transverse profile of the receiving surface. These solutions are generally very suitable when the receiving surface has a known, controlled geometry, which is generally the case when a rigid shape or core is used, and also when it is necessary to deposit a quantity of rubber or cord in accordance with a particular transverse profile. The latter application is achieved by appropriately adapting the transverse pitch of the movement of the application head relative to the receiving surface so as to superpose and juxtapose the strips relative to one another in controlled and variable manner.

However, there are situations in which these devices may be considered too cumbersome to use or unsuitable.

A situation of this type arises with regard to the process of retreading tyre casings, during which it is necessary to deposit a thin layer of rubber known as bonding rubber on the outer surface of a tyre during retreading so as to reinforce the interface between the carcass and the tread. Situated at the heart of the tyre, these rubbers have the special features of being very reactive and of exhibiting very short curing times in order to minimise heat transfer when effecting vulcanisation of the carcass, in a press or autoclave, once it has been covered with its tread. This is the case in particular when rubbers known as self-curing rubbers and precured treads are used.

Under these conditions, there is no longer any question of using bonding rubbers in the form of precalendered rubber strips of the width of the receiving surface and laid as required on the latter, prior to laying of the tread, because the properties of the bonding rubber change too quickly, thus creating pressures in the organisation of the manufacturing process due to the need to limit storage and waiting times.

An elegant solution consists in depositing a bonding rubber strip coming directly from an extruder or a suitable calender in successive windings of contiguous turns, and in directly thereafter depositing the strip on the receiving surface.

In order to make use of this process entirely satisfactory, it is also advisable to remove one last obstacle consisting in the fact that tyres in the course of retreading have receiving surfaces whose transverse profiles may exhibit shapes which vary considerably from one size to another, but also within one and the same size. If it were wished to use one of the processes such as described in the prior art, it would be necessary to develop as many control formulae or algorithms for the movements of the application head as there were particular sizes and shapes of the strip receiving surface, which could entail not inconsiderable costs.

The invention such as described below has as its object the removal of the latter difficulty and proposes an apparatus allowing deposition of a strip on a rotating surface having any shape without its being necessary beforehand to determine a formula for controlling the movements of the application head.

SUMMARY OF THE INVENTION

This apparatus is composed of:
a frame supporting the receiving surface and provided with a motor designed to set the latter in rotation,
a supply module for said strip, cooperating with a laying head emerging into an application means designed to deposit the strip on said receiving surface, said laying head being capable of performing translational movements along an axis XX' parallel to the axis of rotation ZZ' of the receiving surface and along an axis YY' parallel to a radial direction passing substantially through the point of contact between the application means for the strip and the receiving surface, said laying head being capable of rotary motion about an axis AA' which is substantially perpendicular to the axes XX' and YY' and tangential to the point of contact between the application means for the strip and the receiving surface.

The apparatus is connected to an automatic control device for each of the components enabling these movements.

This assembly is characterised in that the laying head comprises a device allowing determination of the angular position of the laying head about the axis AA' and estimation of the tangency angle formed between the tangent TT' to the transverse profile of the receiving surface at the point of contact between the application means for the strip and the receiving surface, and an axis parallel to the axis of rotation ZZ'.

The movements of the laying head in rotation about the axis AA' and in translation along the axes XX' and YY' are suitably determined as a function of the value of the tangency angle.

For this purpose, it is sufficient to calculate at each moment the values of the displacements of the laying head along axes XX' and YY', these values being dependent in fact on the instantaneous value of the tangency angle and the predetermined value of a constant pitch, generally substantially equal to the width of the strip, in order to obtain, on each rotation of the receiving surface, continuous displacement of said laying head in a direction parallel to the direction of the tangent TT' at the point of contact between the application means and the receiving surface, in such a way that the distance between two consecutive turns is equal to the pitch value at all points of the circumference. The same automatic device is also capable of controlling the orientation of the laying head, also dependent solely on the variation of the tangency angle, so as to position the strip at a tangent to the receiving surface at the point of application, making the transverse direction of said strip parallel to the tangent TT'. This allows precise juxtaposition of each of the turns relative to the turns directly adjacent thereto, and deposition of a uniform layer on the receiving surface.

The laying head thus follows the shape of the transverse profile without requiring prior knowledge of the latter and without its being necessary to use a template for the shape of said transverse profile or to input into the automatic device data concerning said profile. It is easy to understand that use of such an apparatus is not limited solely to application of a bonding rubber for retreading tyre casings.

A first example of use relates to the manufacture of tyres designed for motorcycles of a high cubic capacity for which it is advantageous to deposit a "zero degree" reinforcement cord ply under the part designed to receive the tread.

Another application which is particularly advantageous concerns all the situations encountered during the manufacture of tyre casings when it is necessary to improve the quality of the interfaces between two layers of rubber of different types or alternatively when it is essential to improve uncured adhesion of a rubber profile element. To solve these issues, use is conventionally made of dissolution by means of solvent and rubber mix. However, the toxicity of the vapours from these solvents causes pollution which it is sought to reduce by all possible means. It is thus easy to imagine that a device such as proposed in the invention is particularly well suited to effecting deposition of a very thin strip of rubber mix on the surface of a casing during manufacture, the cross-sectional profile of which is eminently variable. This layer of rubber several hundredths of a millimetre thick advantageously replaces all solvent-based dissolution and represents a quantity of material equivalent to that formerly deposited.

BRIEF DESCRIPTION OF THE DRAWING

The following description is intended to provide a non-limitative example of embodiment of an apparatus according to the invention and is made with reference to the Figures in which.

DETAILED DESCRIPTION OF PREFERRED EMBODIMENTS

Hereinafter, the same reference numerals will be used to denote elements of the apparatus having identical functions, such as represented in FIGS. 1 to 9.

Figure 1:
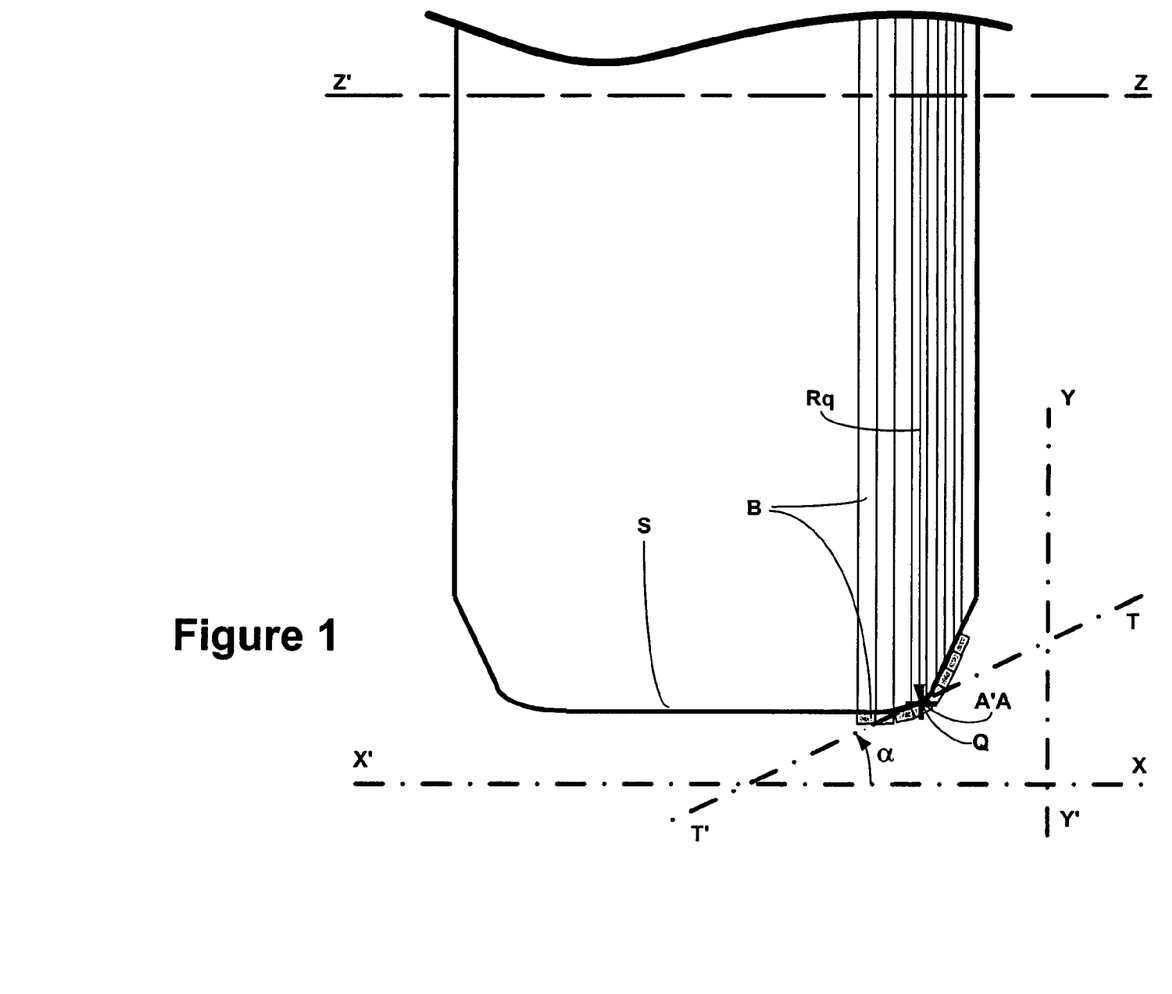
FIG. 1 is a diagram illustrating the respective positions of the axes describing the relative movements of the various components of the apparatus.

FIG. 1 illustrates the respective positions of the locating axes useful in describing an apparatus according to the invention.

With reference to the axis of rotation ZZ' of the receiving surface S, the axes XX' and YY' are respectively successively positioned parallel to the axis ZZ' and parallel to a radial direction passing through the point Q corresponding substantially to the centre of contact between the application means 112 for the strip B and the receiving surface S. The direction YY' is thus perpendicular to the axes XX' and ZZ', and the plane formed by the directions XX' and YY' passing through the point Q is an equatorial plane passing through the axis ZZ', whose intersection with the surface S delimits the transverse profile of the latter.

The tangent TT' to the transverse profile of the receiving surface at the point of contact Q forms a tangency angle $\alpha$ with the direction of the axis XX'.

The radial distance from the point Q to the axis ZZ' is designated Rq. The circumferential speed Vq at the point Q is equal to $2*\pi*N*Rq$, where N represents the number of turns per unit time of the receiving surface. The value of Rq may be measured at each moment during displacement of the laying head along the transverse profile of the receiving surface if the position of the axis ZZ' is indexed correctly at a point of reference formed on axis YY'. Knowing the successive values of the displacements performed along the axis YY', it is easy to deduce the values of Rq and, if it is desired to make the circumferential speed value Vq at point Q constant and equal to a predetermined reference speed V, it is sufficient to adjust the speed of rotation N of the receiving surface such that N is equal to $V/2*\pi*Rq$.

In the application such as described below, the shape of the receiving surface is substantially toroidal, but the following may easily be adapted to a substantially cylindrical or conical shape or the like, without going beyond the general principles of operation of an apparatus according to the invention.

Figure 2:
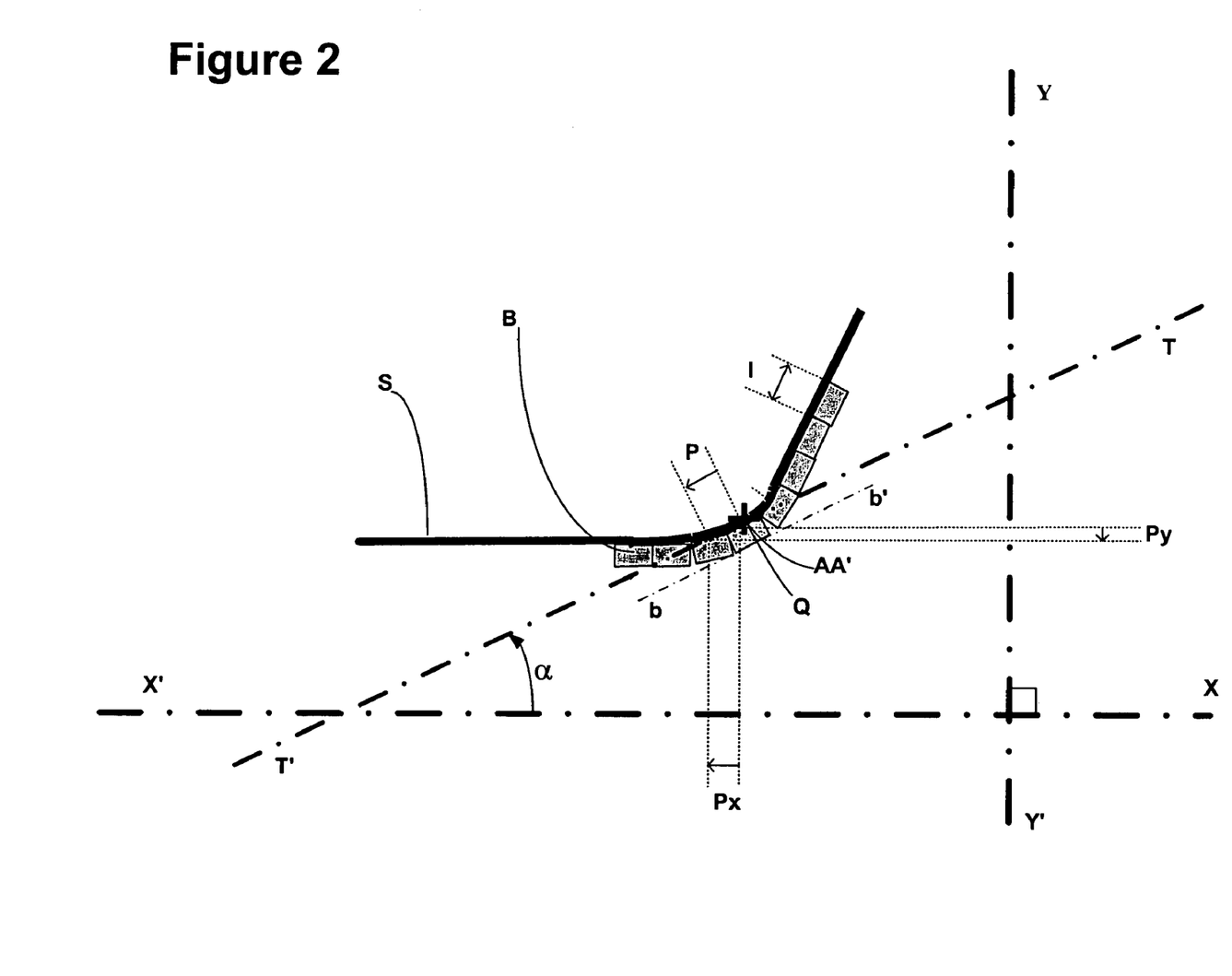
FIG. 2 is a detailed explanatory diagram of the displacements of the laying head at the point of contact between the application means and the receiving surface.

FIG. 2 details the relative displacements of the laying head relative to the receiving surface along the axes XX' and YY'.

On each rotation of the surface S, it is in fact sought to displace the laying head and the means of applying the strip B onto the receiving surface in a direction tangential to the transverse profile of the latter by the value of a predetermined constant pitch P generally substantially equal to the value of the width 1 of the strip B. In order to do this, it is thus advisable to effect on each rotation a continuous movement in the direction TT' such that the laying head is offset by a distance equal to P after each revolution. Knowing the value of the tangency angle α, it is readily possible to calculate the values of these displacements in directions XX' and YY', i.e. respectively Px and Py, where Px is equal to P*cosine α and where Py is equal to P*sine α. It will be noted that the value of the pitch P may be adapted, depending on whether it is desired to make the strip turns overlap to a greater or lesser degree.

So that the distance between two consecutive turns is equal at all points of the circumference to the value of the pitch P, the relative movement of the application head relative to the receiving surface takes place continuously, and thus in proportion to the speed of rotation N. The instantaneous displacement speeds along axes XX' and YY' will thus be calculated such that Vx is equal to N*Px and Vy is equal to N*Py.

The axis AA' passing through the point of contact Q between the application means 112 and the receiving surface is substantially perpendicular to the plane formed by the axes XX' and YY' passing through Q. It may thus be considered that application of the strip B on the receiving surface is effected at a tangent to the latter when the plane formed by the strip at the point of contact Q is tangential to the surface S and the direction bb' which is transverse relative to the strip at the point of application is parallel to direction TT'. Knowing the tangency angle α allows the automatic device to control the rotation to be effected about the axis AA' in order to keep the direction bb' parallel to the direction TT'.

The values of the pitch P and the speed V are constants, which may be determined independently of knowledge of the transverse profile of the surface S. Thus, merely knowing the instantaneous value of the tangency angle α makes it possible to determine all the relative movements of the application head relative to the receiving surface S, in rotation about the axis AA' and in translation in directions XX' and YY', without its being necessary to use a template tailored to the transverse profile of said surface or to input beforehand the shape of said profile into a memory of the automatic control device.

Figure 3:
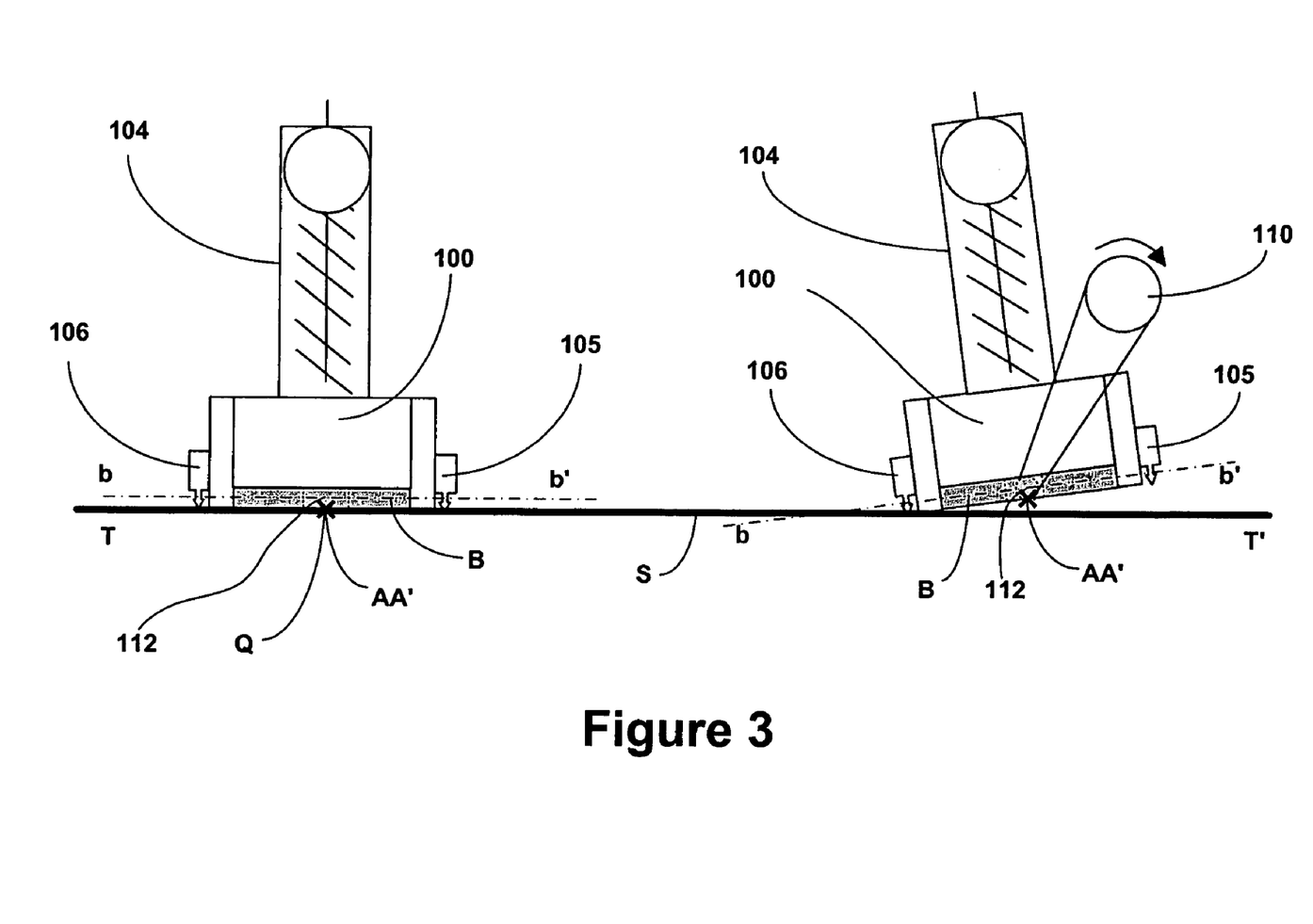
FIG. 3 is a schematic view of a device allowing determination of the tangency angle.

FIG. 3 illustrates a particular embodiment of a device allowing the tangency angle α to be estimated, in which the application head 100 is equipped with two sensors 105 and 106 situated on the laying head transversely on either side of the application means 112. When these two sensors are in contact with the receiving surface S, it may be deduced therefrom that the axis bb' at the point of contact Q between the application means and the receiving surface is substantially parallel to the axis TT' tangential to the transverse profile of the receiving surface S at the point Q and coincident with the latter in this schematic illustration. When one of the sensors is no longer in contact with the surface S, i.e., when the travel path of the laying head has deviated from the tangent TT', a motor 110 causes the travel path of the laying head to be corrected by being pivoted about the axis AA' so as to bring said sensor back into contact with the receiving surface. It is then sufficient to index the rotary movements about the axis AA' in relation to an angular point of reference provided so as to know at each moment the value of the tangency angle α.

It is advisable, however, for the sensors 105 and 106 to be as close as possible to one another so that the angle α can be known as precisely as possible. In practice, their spacing is substantially equal to the width 1 of the strip B.

This device is particularly impressive insofar as it makes it possible simultaneously to know the value of the tangency angle α and to ensure parallelism between the axis bb' and the tangent TT', so effecting laying of the strip B tangentially relative to the surface S.

Other devices for measuring the tangency angle α, making use of independent sensors, are possible and allow the performance of functions equivalent to those described above. By way of example, mention will be made of the possibility of incident measurement by laser beam at two points close to the axis TT' or alternatively of using an air cushion at a controlled pressure.

Figure 4:
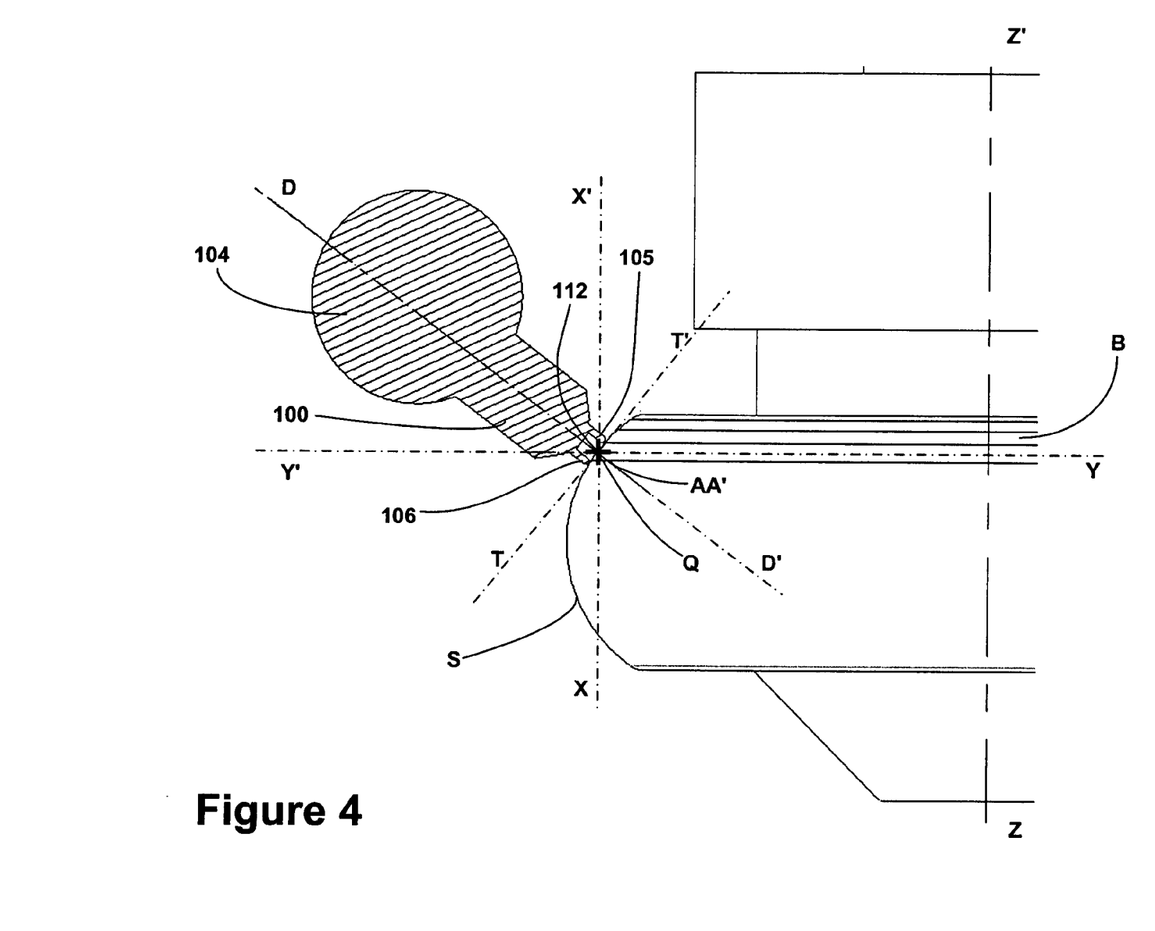
FIG. 4 is a diagram of the relative positions of the laying head and the receiving surface.

FIG. 4 is a schematic view of the respective positions of the laying head 100 of the application means 112 and the receiving surface S during laying of a strip.

If it is wished to deposit a strip B consisting of a rubber mix, it is particularly wise to incorporate the extrusion die 104 in the laying head, as illustrated schematically in FIGS. 3 and 4. This arrangement makes it possible, if it is chosen to make the laying head mobile relative to the receiving surface, to avoid use of a module for supplying the strip from a stationary module to the laying head. A module having this function generally comprises a plurality of return idlers and brings about geometric changes to the strip, so affecting the uniformity of the width of the latter and the contiguity of the strip turns relative to one another.

In the case of a strip comprising reinforcing cables, recourse will be made to a conventional unwinding module not described in detail in the context of the present description and allowing the strip to be brought to the laying head.

The application means 112 is adapted to the nature of the strip to be deposited and has the function of ensuring that the latter is brought into contact with the receiving surface. It may consist of a roller in the case of a strip coming from a supply module not incorporated into the laying head or alternatively of the orifice of the extrusion means 104 when the latter is incorporated into the laying head 100. It will be noted that the plane of the strip B at the level of the point of application Q is tangential to the receiving surface S.

Figure 5:
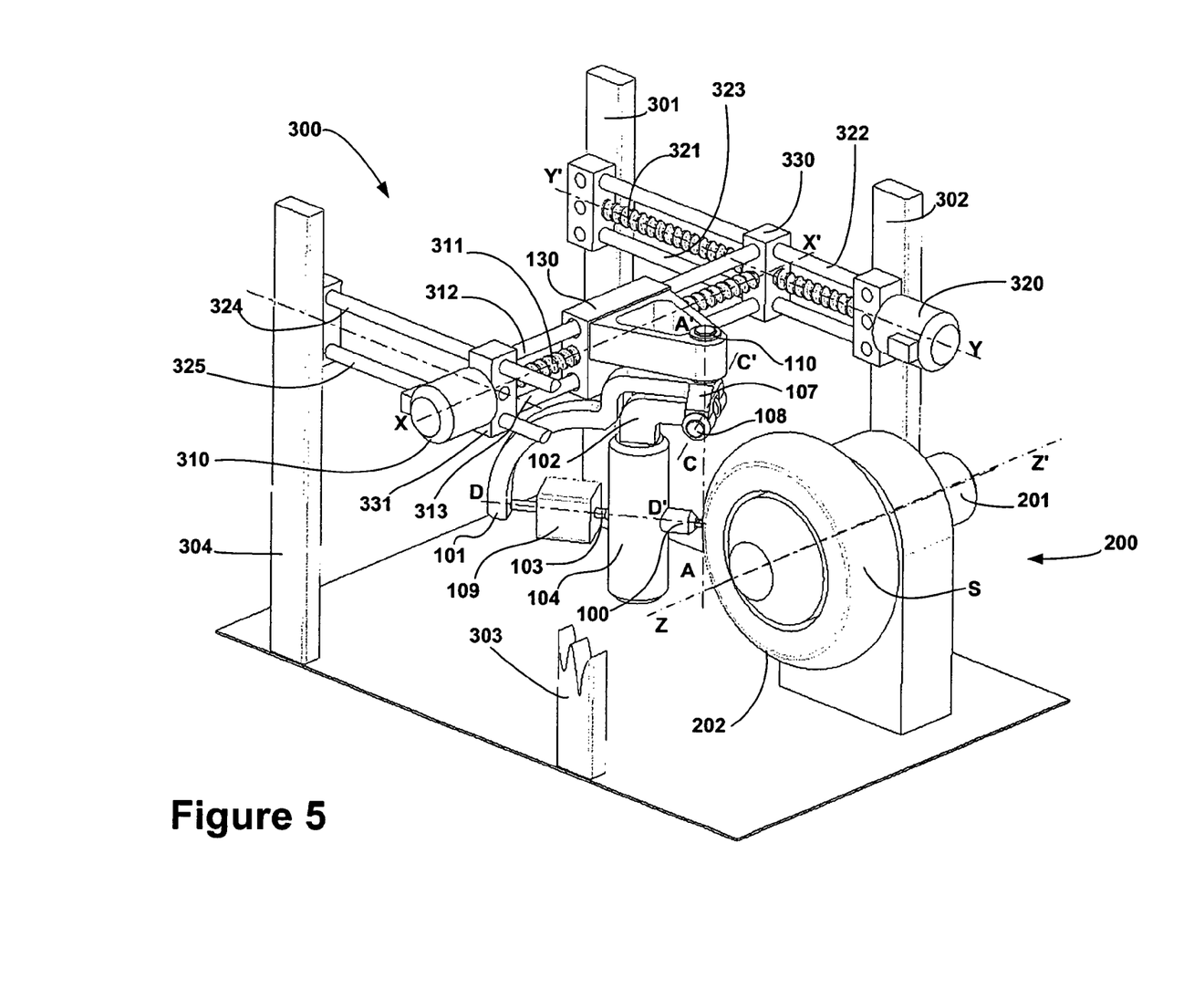
FIG. 5 is a schematic perspective view of installation of an apparatus according to the invention.

The apparatus as illustrated in schematic perspective view in FIG. 5 is composed of a frame 200 supporting a tyre carcass 202 whose outer surface S is intended to receive a strip.

The surface S is driven in rotation about the axis ZZ' by a motor 201.

A framework 300 supports all the components allowing displacement of the laying head 100 relative to the receiving surface S in the directions XX' and YY'.

It will be noted that, in the case of the application described here by way of an example of embodiment of the invention and in the context of the geometric system of reference of the apparatus selected, the frame 200 is stationary and the laying head moves relative to the latter. It is also possible, without departing from the spirit of the invention, to provide a stationary laying head and a frame movable in directions XX' and YY'.

The metallic framework consists of four columns, 301, 302, 303, 304, installed on the same base as the frame 200. These columns support shafts motor-driven translationally in directions which coincide with the axes XX' and YY'. Each of these shafts is composed of an endless screw, 311, 321, motor-driven by motors 310, 320 in order to drive plates 330, 331 and 130 sliding on slides 312, 313 and 322, 323, 324, 325 themselves parallel respectively to the directions XX and YY'.

In this configuration, the plate 130 is caused to move in a plane formed by the axes XX' and YY'.

To ensure displacement along the axes XX', YY' and rotation about the axis AA', it is possible to select motors of the asynchronous type, respectively 310, 320 and 110, or using an equivalent technology, servo-driven with regard to position by means of a positioning sensor. This technology makes it possible to position the application head with sufficient precision.

This configuration is the simplest embodiment, but it is possible to dispose the axes XX' and YY' in a different way or alternatively to combine rotational movements with translational movements with the aim of causing the plate to describe a movement in a plane and allowing the laying head to reach all the points on the surface S. It is sufficient for the person skilled in the art to adapt accordingly calculation of the displacement values.

The plate 130 supports a motor-driven shaft 110 on which is fixed a foot 107. The motor-driven shaft 110 substantially coincides with the axis AA'.

It would be entirely possible to operate the apparatus by disposing the laying head 100 directly on the foot 107 through the intermediary of an arm. However, this mode of operation does not permit emancipation from the localised circumferential irregularities of the surface S and it has proven advantageous to provide a system allowing the laying head to be applied to the laying surface S with a constant pressure.

To this end, the foot 107 in turn supports a shaft 108 pivoting freely about an axis CC' and to which an arm 102 is connected. The axis CC' is perpendicular to the axis AA' and substantially parallel to the transverse direction bb' of the strip B at the level of the application means and in the plane of the strip at the point of application Q. For this reason, when the application means 112 is in contact with the surface S, the axis CC' is substantially parallel to the direction TT' tangential to the transverse profile of the surface S at the point of contact Q between the application means 112 and the receiving surface S.

A bracket 101 is also fixed by one of its ends to the foot 107. The extrusion die 104 is fixed on the arm 102 and emerges into the application means 112 disposed on the laying head 100. A piston 109 is connected to the other end of the bracket 101 and applies a constant force, in a direction DD' perpendicular to the axis CC' (see also FIG. 4), to the back of the extrusion die 104 so as to keep the application means in permanent contact with the surface S whatever the local circumferential irregularities of the latter.

Figure 6:
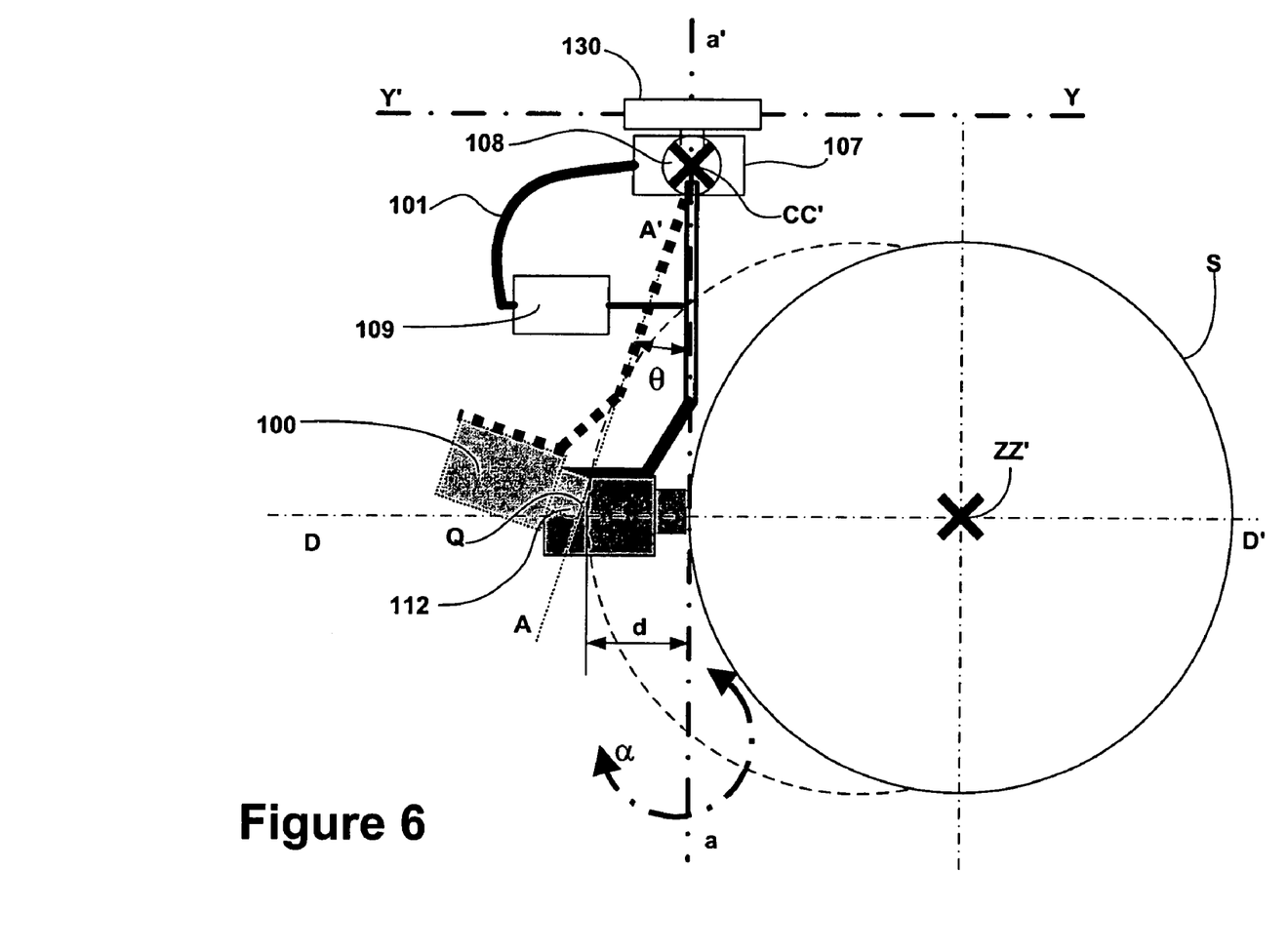
FIG. 6 shows an operational diagram of the apparatus such as described in FIG. 5.

It is thus advisable, as shown schematically in FIG. 6, to adjust the position of the plate 130 in the directions XX' and YY' in order to keep the value of the angular divergence θ, also known as the compliance angle, equal to zero so as to ensure that the axis AA' passing through the application point Q coincides with the axis aa" perpendicular to the plane formed by the axes XX' and YY'.

To this end, a device 103, placed on the mobile part of the piston 109, makes it possible to measure the "compliance" angular divergence θ (see FIG. 6) which the arm 102 forms, by pivoting about the axis CC', with the direction AA'.

It will be noted, in the case of this application, that the angular divergence θ is small and it is thus entirely possible to liken measurement thereof to that of a displacement d along the axis DD'.

The values of the displacements Px and Py in the directions XX' and YY' are thus corrected by a divergence f(θ) and g(θ), which are thus functions of the value of the tangency angle α, of the compliance angular divergence θ, and of the geometric configuration of the arm 102.

Px becomes equal to P*cosine α+f(θ) and Py is equal to P*sine α+g(θ). In the case of the present application f(θ) is equal to d*sine α and g(θ) is equal to d*cosine α.

Figure 7:
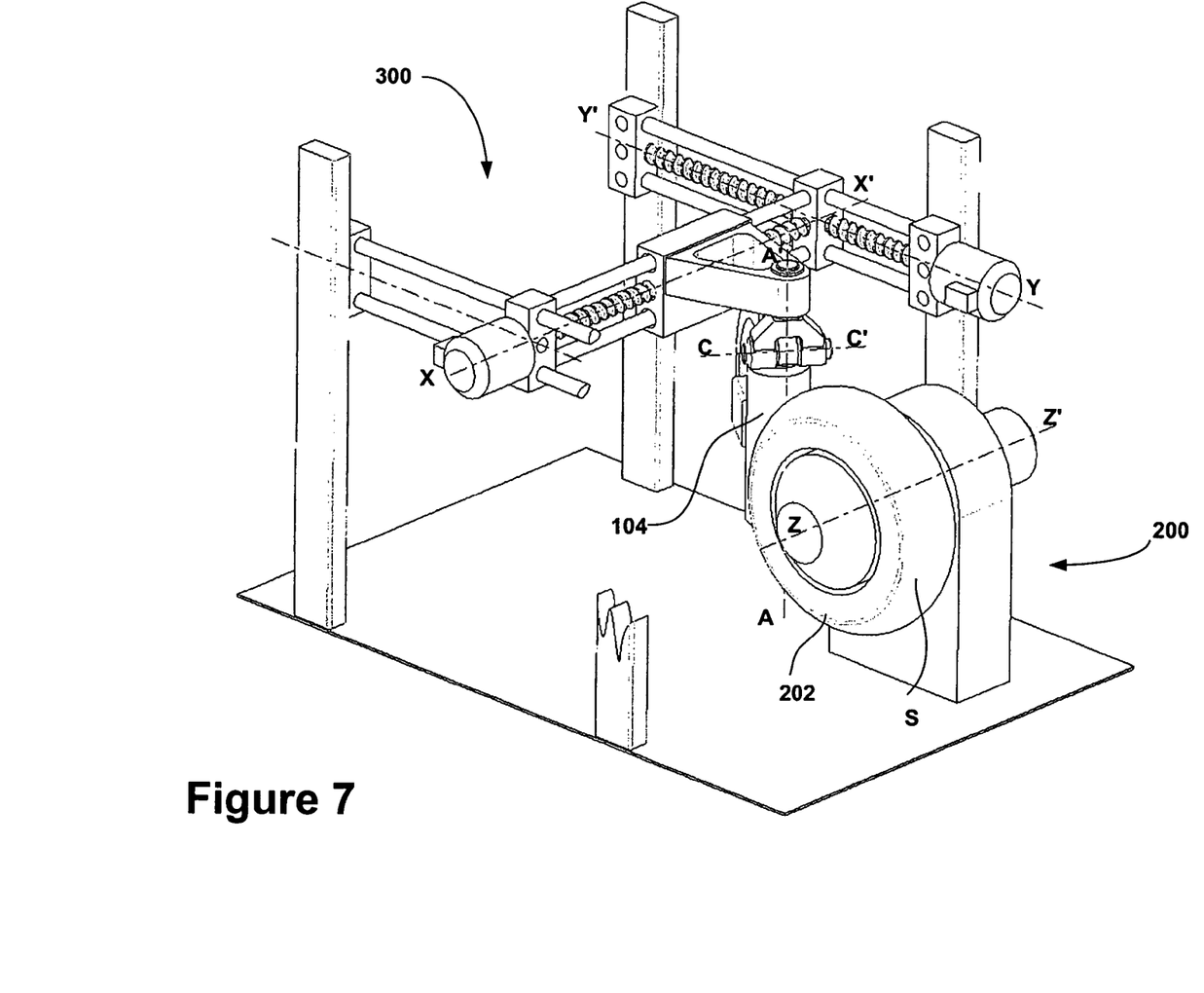
FIG. 7 is a schematic perspective view of installation of the apparatus such as described in FIGS. 5 and 6, in a second position.

FIG. 7 shows the apparatus as described above with the laying head 100 in a different position relative to the surface S.

Figure 8:
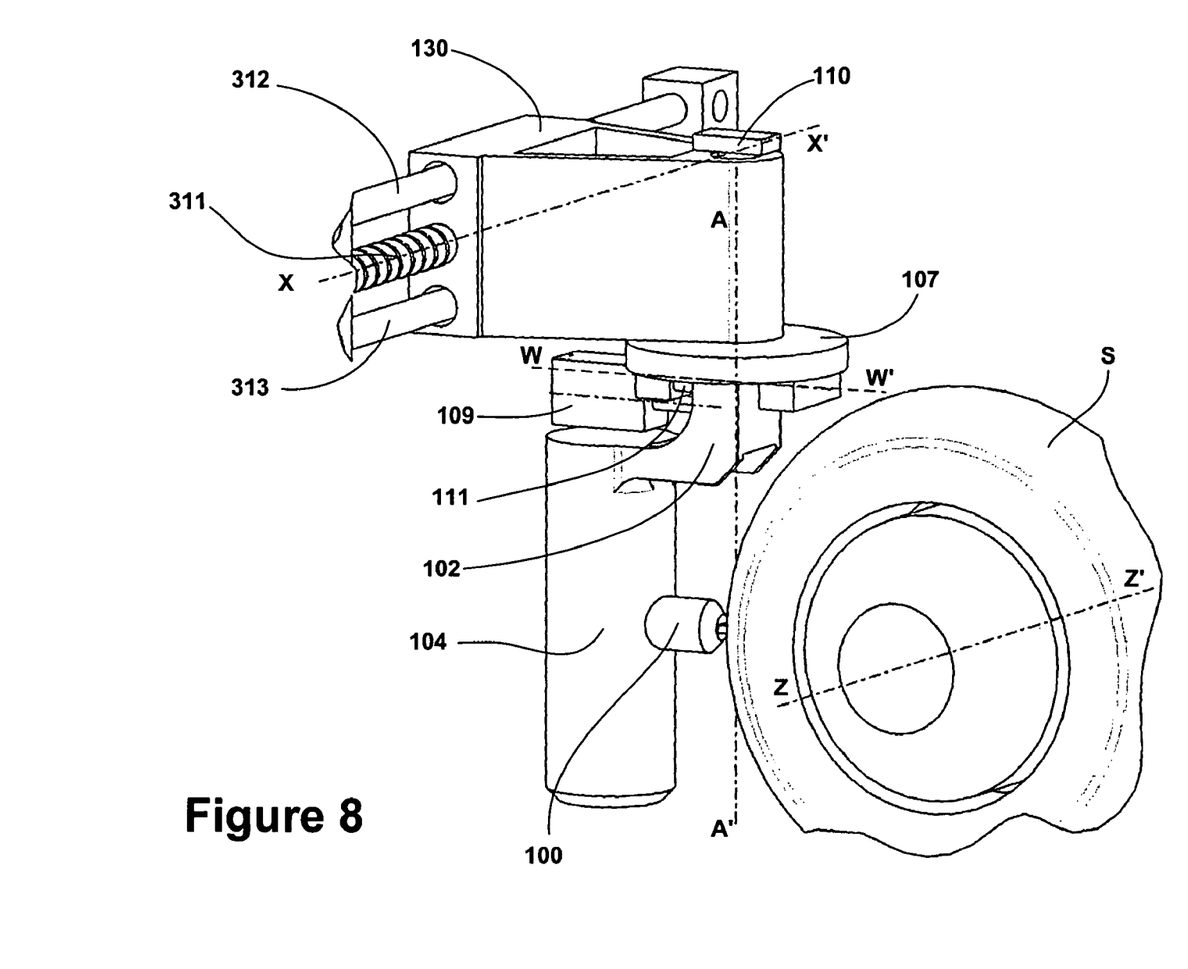
FIG. 8 is a schematic partial perspective view of a device according to the invention according to one variant embodiment.

Likewise, the mechanical device used to connect the laying head 100 to the plate 130 may be replaced by an equivalent mechanism such as is shown in FIG. 8. In this variant embodiment, the plate 130 supports a motor-driven shaft 110 on which is fixed a foot 107. The motor-driven shaft substantially coincides with the axis AA'. The foot 107 supports a slide 111 on which the arm 102 slides freely in a direction WW' perpendicular to the axis AA' and to the transverse direction bb' of the strip B at the point of contact Q between the application means 112 and the receiving surface. Thus, when the application means is in contact with the surface S, the axis WW' is perpendicular to the plane formed by the strip at the point of contact Q between the application means 112 and the receiving surface S, or alternatively to the direction TT' tangential to the profile of the surface S at the point of application Q. The arm 102 supports the extrusion die 104, which emerges into the application means 112 for the strip B situated on the application head 100.

A piston 109 is fixed by one of its ends to the foot 107 and applies a constant force to the arm 102 in a direction parallel to the direction WW' so as to keep the application means 112 in permanent contact with the surface S.

Figure 9A:
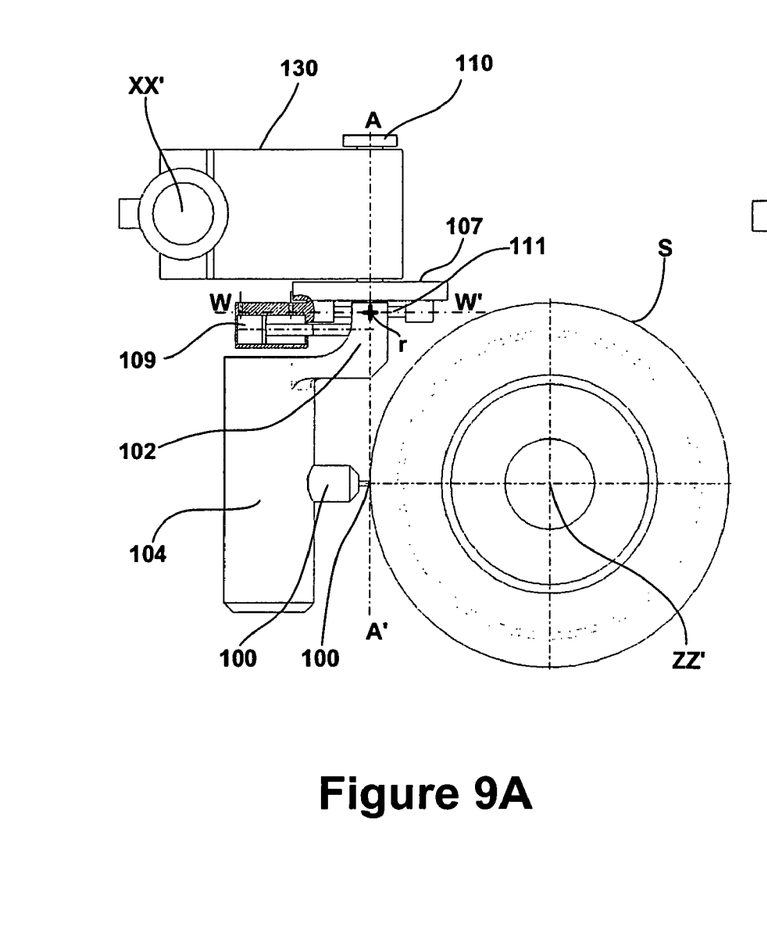
FIGS. 9A and 9B show an operational diagram of the variant described in FIG. 8.
Figure 9B:
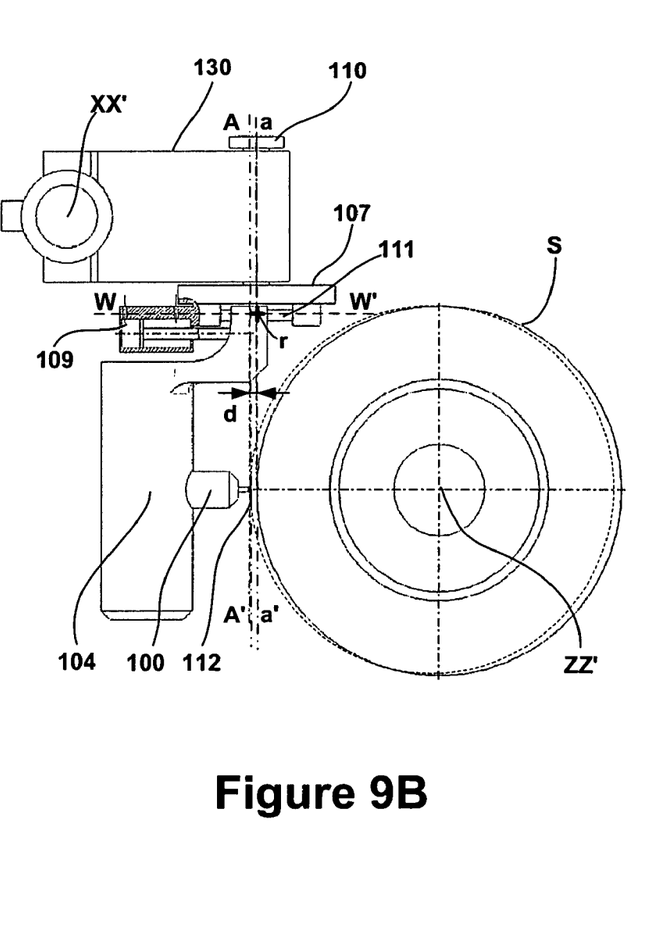

A device 103 (not illustrated) makes it possible to measure the distance d, known as compliance distance, between the axis AA' and an axis aa' parallel to AA' and passing through a reference point r situated on the axis WW', as represented in FIGS. 9A and 9B.

The automatic device corrects the values of the displacements Px and Py such that the axis aa" and the axis AA' always coincide.

Px thus becomes equal to P*cosine α+f(d) and Py is equal to P*sine α+g(d), where f(d) is equal to d*sine α and g(d) is equal to d*cosine α.

Implementation of an apparatus matching that which has served as basis for the above description is facilitated considerably by its great capacity for adaptation.

By way of example, a brief description will be provided below of the process for laying a strip on a substantially toroidal receiving surface, in the case in point a tyre carcass.

In a first stage of the laying process, the operator is invited by the automatic device to input the values of the constant parameters such as the value of the pitch P, the value of the circumferential speed V, as well as the values of the starting conditions and the conditions of disengagement upon completion of laying.

In a second stage, and for a given size, the operator manually positions the laying head by acting directly, through the intermediary of control buttons situated on the front face of the automatic device, on the motors 310 and 320 controlling the XX' and YY' movements, and on the motor 110 controlling rotation about the axis AA', so as to bring the application means approximately into a tangent with the point on the surface S which he has previously selected.

It is thus possible to start up the automatic device which will cause actuation of the piston-cylinder unit 109 and advance of the laying head 100 so as to seek contact with the receiving surface. Contact is established when one of the sensors 105 or 106 is actuated. The automatic device may then act on the motor 110 in such a way that the two sensors are simultaneously in contact with the receiving surface, while adjusting compliance in such a way that the compliance angle or distance is equal to zero. The automatic device then stores the coordinates of the starting point on the axes XX' and YY', which will be designated Xd and Yd, as well as the initial value of the tangency angle α designated ad. Finally, the automatic device sets in motion the receiving surface, so adjusting the speed of rotation as to make it equal to the speed V input beforehand, and laying of the strip may commence.

The automatic device determines at each moment, on the basis of the value of the tangency angle α, the displacements of the application head in a direction substantially parallel to the tangent TT' in such a way that the distance between two consecutive turns is equal at all points of the circumference to the value of a given pitch P, and orients the application head about the axis AA' in such a way that the transverse direction bb' of the strip B at the point of contact Q between the strip application means and the receiving surface S is parallel to the tangent TT'. It may thus be said that the laying head "follows" the shape of the transverse profile of the receiving surface.

The laying cycle continues without its being necessary for the operator to intervene in any manner and, unless said operator interrupts it, the cycle will be completed when the laying head has reached a position symmetrical to the starting position relative to a plane perpendicular to the axis ZZ' and passing through the equator of the casing or when the position on YY' is once again equal to the starting position.

On completion of the laying cycle, the automatic device displaces the laying head into a disengaged position allowing the operator to continue the operation of building the tyre casing.

In the following cycle, if the size to be processed is similar enough to that which went before, the automatic device will position the laying head directly at the prerecorded values Xd, Yd and ad before initiating the laying cycle.

It is advisable to note that this example of use is in no way limiting and it is easy to imagine other conditions for starting and stopping the cycle of the automatic device. Thus, when the receiving surface exhibits a substantially cylindrical shape, positioning along the axis XX' of the laying head at the beginning and end of the cycle may either be prerecorded, which represents a considerable time saving relative to the situations where it was also necessary to store the shape of the transverse profile of the receiving surface, or determined manually by the operator in accordance with requirements.

The invention claimed is:

1. A process for laying a strip on a substantially cylindrical or toroidal receiving surface rotating about a first axis, the process utilizing a laying head having an application device, the laying head being movable translationally along a second axis oriented parallel to the first axis and along a third axis oriented parallel to the line which extends radially from the first axis and substantially passes through a point of contact between the application device and the receiving surface, the laying head being rotatable about a fourth axis oriented substantially perpendicular to the second and third axes and tangential to the receiving surface at the point of contact, the process comprising the steps of:
    A) continuously depositing the strip on the rotating receiving surface while determining an angular position of the laying head about the fourth axis and while directly sensing the receiving surface by a sensor for assessing a tangency angle formed between a tangent to the transverse profile of the receiving surface at the point of contact and an axis parallel to the first axis,
    B) during each rotation of the receiving surface in step A, displacing the laying head continuously wherein a distance between two consecutive turns of the strip defines a pitch which is constant; and
    C) adaptably controlling movements of the laying head about the fourth axis and along the second and third axes during steps A and B as a function solely of the value of the assessed tangency angle, so as to displace the laying head continuously during each revolution of the receiving surface, in a direction substantially parallel to said tangent for achieving said constant pitch between consecutive windings.

2. The process according to claim 1 wherein step A comprises controlling the orientation of the laying head about the fourth axis such that the transverse direction of the strip at the point of contact is parallel to the tangent.

3. The process according to claim 2 wherein the pitch is substantially equal to the strip width.

4. The process according to claim 3 further including, during step A, adjusting a rotational speed of the receiving surface to render constant a circumferential speed of strip application at the point of contact.

5. The process according to claim 1 wherein step A comprises supporting the laying head on a plate by a motor-driven first shaft while moving the plate translationally along the second and third axes and turning the first shaft about the fourth axis; supporting a foot on the first shaft and supporting on the foot a second shaft which rotates freely around a fifth axis which is oriented perpendicular to the fourth axis and parallel to the transverse direction of the strip at the point of contact; estimating the value of a compliance angular divergence angle formed by pivoting the arm about the fifth axis from the fourth axis to a straight line oriented perpendicular to a plane defined by the second and third axes; and correcting the position of the plate along the second and third axes to bring the compliance angular divergence value to a value substantially equal to zero.

6. The process according to claim 1 wherein step A comprises supporting the laying head on a plate by a motor-driven first shaft while moving the plate translationally along the second and third axes and turning the first shaft about the fourth axis; supporting a foot on the first shaft and supporting on the foot a slide oriented along a sixth axis oriented perpendicular to a plane formed by the strip at the point of contact; supporting on the slide an arm which slides freely on the slide; fixedly supporting the laying head on the arm; estimating the value of a compliance distance between the fourth axis and a straight line which is oriented parallel to the fourth axis and passing through a reference point situated on the sixth axis; and correcting the position of the plate on the second and third axes to bring the compliance distance to a value substantially equal to zero.

7. The process according to claim 1 wherein the receiving surface is of substantially toroidal shape.

8. The process according to claim 1 wherein the receiving surface is of substantially cylindrical shape.

9. The process according to claim 1 wherein the step of assessing the tangency angle includes sensing deviations of a travel path of the laying head from the tangent at the point of contact.

10. The process according to claim 9, further including correcting the travel path of the laying head until no deviation is sensed.

11. A process for laying a strip on a receiving surface rotating about a first axis, the process utilizing a laying head having an application device, the laying head being movable translationally along a second axis oriented parallel to the first axis and along a third axis oriented parallel to the line which extends radially from the first axis and substantially passes through a point of contact between the application device and the receiving surface, the laying head being rotatable about a fourth axis oriented substantially perpendicular to the second and third axes and tangential to the receiving surface at the point of contact, the process comprising the steps of:
- A) depositing the strip on the rotating receiving surface while determining an angular position of the laying head about the fourth axis and assessing a tangency angle formed between a tangent to the transverse profile of the receiving surface at the point of contact and an axis parallel to the first axis, and
- B) automatically controlling movements of the laying head about the fourth axis and along the second and third axes during step A as a function of the tangency angle;

wherein step A further comprises supporting the laying head on a plate by a motor-driven first shaft while moving the plate translationally along the second and third axes and turning the first shaft about the fourth axis; supporting a foot on the first shaft and supporting on the foot a second shaft which rotates freely around a fifth axis which is oriented perpendicular to the fourth axis and parallel to the transverse direction of the strip at the point of contact; estimating the value of a compliance angular divergence angle formed by pivoting the arm about the fifth axis from the fourth axis to a straight line oriented perpendicular to a plane defined by the second and third axes; and correcting the position of the plate along the second and third axes to bring the compliance angular divergence value to a value substantially equal to zero.

12. A process for laying a strip on a receiving surface rotating about a first axis, the process utilizing a laying head having an application device, the laying head being movable translationally along a second axis oriented parallel to the first axis and along a third axis oriented parallel to the line which extends radially from the first axis and substantially passes through a point of contact between the application device and the receiving surface, the laying head being rotatable about a fourth axis oriented substantially perpendicular to the second and third axes and tangential to the receiving surface at the point of contact, the process comprising the steps of:
- A) depositing the strip on the rotating receiving surface while determining an angular position of the laying head about the fourth axis and assessing a tangency angle formed between a tangent to the transverse profile of the receiving surface at the point of contact and an axis parallel to the first axis, and
- B) automatically controlling movements of the laying head about the fourth axis and along the second and third axes during step A as a function of the tangency angle;

wherein step A further comprises supporting the laying head on a plate by a motor-driven first shaft while moving the plate translationally along the second and third axes and turning the first shaft about the fourth axis; supporting a foot on the first shaft and supporting on the foot a slide oriented along a sixth axis oriented perpendicular to a plant formed by the strip at the point of contact; supporting on the slide an arm which slides freely on the slide; fixedly supporting the laying head on the arm; estimating the value of a compliance distance between the fourth axis and a straight line which is oriented parallel to the fourth axis and passing through a reference point situated on the sixth axis; and correcting the position of the plate on the second and third axes to bring the compliance distance to a value substantially equal to zero.

\* \* \* \* \*